(12) United States Patent
Takahashi et al.

(10) Patent No.: US 12,097,832 B2
(45) Date of Patent: Sep. 24, 2024

(54) WORK VEHICLE

(71) Applicant: KUBOTA CORPORATION, Osaka (JP)

(72) Inventors: Naoko Takahashi, Sakai (JP); Shinsuke Ishii, Sakai (JP); Marina Nagatomi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/279,235

(22) PCT Filed: Mar. 9, 2022

(86) PCT No.: PCT/JP2022/010420
§ 371 (c)(1),
(2) Date: Aug. 29, 2023

(87) PCT Pub. No.: WO2022/209683
PCT Pub. Date: Oct. 6, 2022

(65) Prior Publication Data
US 2024/0140371 A1   May 2, 2024

(30) Foreign Application Priority Data
Mar. 29, 2021 (JP) ................. 2021-056314

(51) Int. Cl.
*B60T 7/10* (2006.01)
*B60T 7/04* (2006.01)
(Continued)

(52) U.S. Cl.
CPC .............. *B60T 7/101* (2013.01); *B60T 7/045* (2013.01); *A01D 69/10* (2013.01); *B60T 17/083* (2013.01)

(58) Field of Classification Search
CPC ........ B60T 7/101; B60T 7/045; B60T 17/083; B60T 7/04; B60T 7/10; B60T 7/06;
(Continued)

(56) References Cited

U.S. PATENT DOCUMENTS

| 1,275,706 A | * | 8/1918 | Langolf | ................. B60K 23/02 |
| | | | | 74/481 |
| 2,899,838 A | * | 8/1959 | Johnstone | ................. G05G 7/02 |
| | | | | 74/540 |

(Continued)

FOREIGN PATENT DOCUMENTS

| JP | 59-026060 U | 2/1984 |
| JP | 02-249747 A | 10/1990 |

(Continued)

OTHER PUBLICATIONS

Official Communication issued in International Patent Application No. PCT/JP2022/010420, mailed on May 24, 2022.

*Primary Examiner* — Vinh Luong
(74) *Attorney, Agent, or Firm* — Keating & Bennett, LLP (57) ABSTRACT

In a work vehicle, a through-hole in a stay includes first and second regions. When a grip is pulled in an unlocked state in which a collar is located inside the first region and a grip assembly is not locked inside the through-hole, a state is transitioned into a locked state in which a compression spring is compressed by a pin and a plain washer, a brake lever rotates, a claw moves toward a notch, and a rod is located inside the second region and the grip assembly is locked inside the through-hole. When a brake pedal is stepped on in this locked state, the claw and the notch engage with each other, and the brake pedal is locked.

4 Claims, 6 Drawing Sheets

(51) Int. Cl.
*A01D 69/10* (2006.01)
*B60T 17/08* (2006.01)

(58) Field of Classification Search
CPC . B60T 7/08; A01D 69/10; G05G 1/01; G05G 1/30
See application file for complete search history.

(56) References Cited

U.S. PATENT DOCUMENTS 6,105,459 A * 8/2000 Troiano .................. G05G 1/30
 74/529
6,164,396 A * 12/2000 Matsufuji ............. B60W 10/10
 180/6.34

FOREIGN PATENT DOCUMENTS

JP 2004-268852 A 9/2004
WO WO 2007039940 A1 * 4/2007 ........... B60K 17/344

* cited by examiner

WORK VEHICLE

CROSS REFERENCE TO RELATED APPLICATIONS

This is a U. S. National Phase Application under 35 U.S.C. § 371 of International Patent Application No. PCT/JP2022/010420, filed on Mar. 9, 2022, which claims priority of Japanese Patent Application No. 2021-056314, filed on Mar. 29, 2021. The entire contents of each application are hereby incorporated by reference.

BACKGROUND OF THE INVENTION

1. Field of the Invention

The present invention relates to a work vehicle.

2. Description of the Related Art

Conventionally, there has been known a work vehicle having a parking brake that operates while stepping on a brake pedal (see, for example, JP-A 2004-268852).

SUMMARY OF THE INVENTION

However, the parking brake disclosed in JP-A 2004-268852 has a problem in that an operator needs to simultaneously perform the operations of stepping on a brake pedal and pulling up a parking brake lever, which is complicated.

Preferred embodiments of the present invention provide work vehicles each including a parking brake that can be easily operated.

A work vehicle according to a preferred embodiment includes a brake pedal, a notch structure attached to the brake pedal and including a notch, a stay including a through-hole, a grip assembly inserted into the through-hole, and a brake lever including a claw at one end, wherein the grip assembly includes a rod with a circular cross-section and a linear shape, a grip at a first end of the rod, a collar at or adjacent to the first end of the rod so as to cover an outer periphery of the rod, a plain washer at a second end of the rod, a pin that covers an outer periphery of the rod, is slidable with respect to the rod, and is fastened at or adjacent to the second end of the brake pedal, and a compression spring that interconnects the plain washer and the pin and that covers the outer periphery of the rod, the through-hole includes a first region in which the collar is slidable, and a second region with a length in a width direction that is shorter than an outer diameter of the collar and longer than an outer diameter of the rod, when the grip is pulled in an unlocked state in which the collar is located inside the first region and the grip assembly is not locked inside the through-hole, a state is transitioned into a locked state in which the compression spring is compressed by the pin and the plain washer, the brake lever rotates, the claw moves toward the notch, and the rod is located inside the second region and the grip assembly is locked inside the through-hole, and when the brake pedal is stepped on in the locked state, the claw and the notch engage with each other, and the brake pedal is locked.

According to preferred embodiments of the present invention, it is possible to provide work vehicles each including a parking brake that can be easily operated.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the accompanying drawings. In the following drawings, the same or similar reference numerals denote the same or similar portions. However, it should be noted that the drawings are schematic, and the proportions of each dimension are different from the actual figures. Therefore, specific dimensions should be determined in consideration of the following explanation. Further, the drawings may include portions having different dimensional relationships and ratios between the drawings. In the present specification and drawings, elements having substantially the same functions and structures are denoted by the same reference numerals, and redundant description thereof is omitted, and elements not directly related to preferred embodiments of the present invention are omitted from the drawings.

First Preferred Embodiment

Hereinafter, a work vehicle 100 according to a first preferred embodiment of the present invention will be described with reference to FIGS. 1 to 6.

Figure 1:
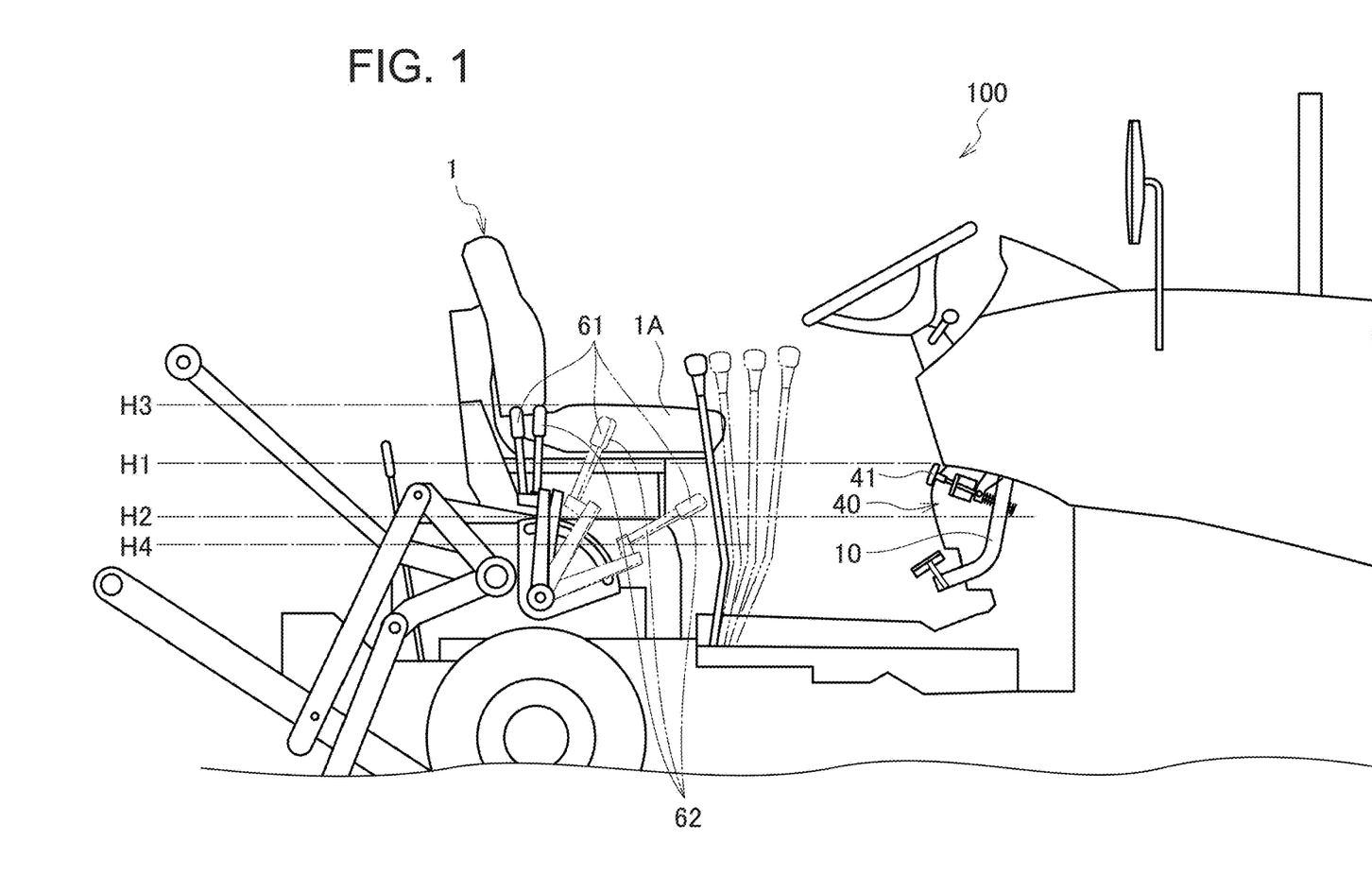
FIG. 1 is a diagram showing an example of portion of a lateral surface of a work vehicle 100 according to a preferred embodiment of the present invention.
Figure 2:
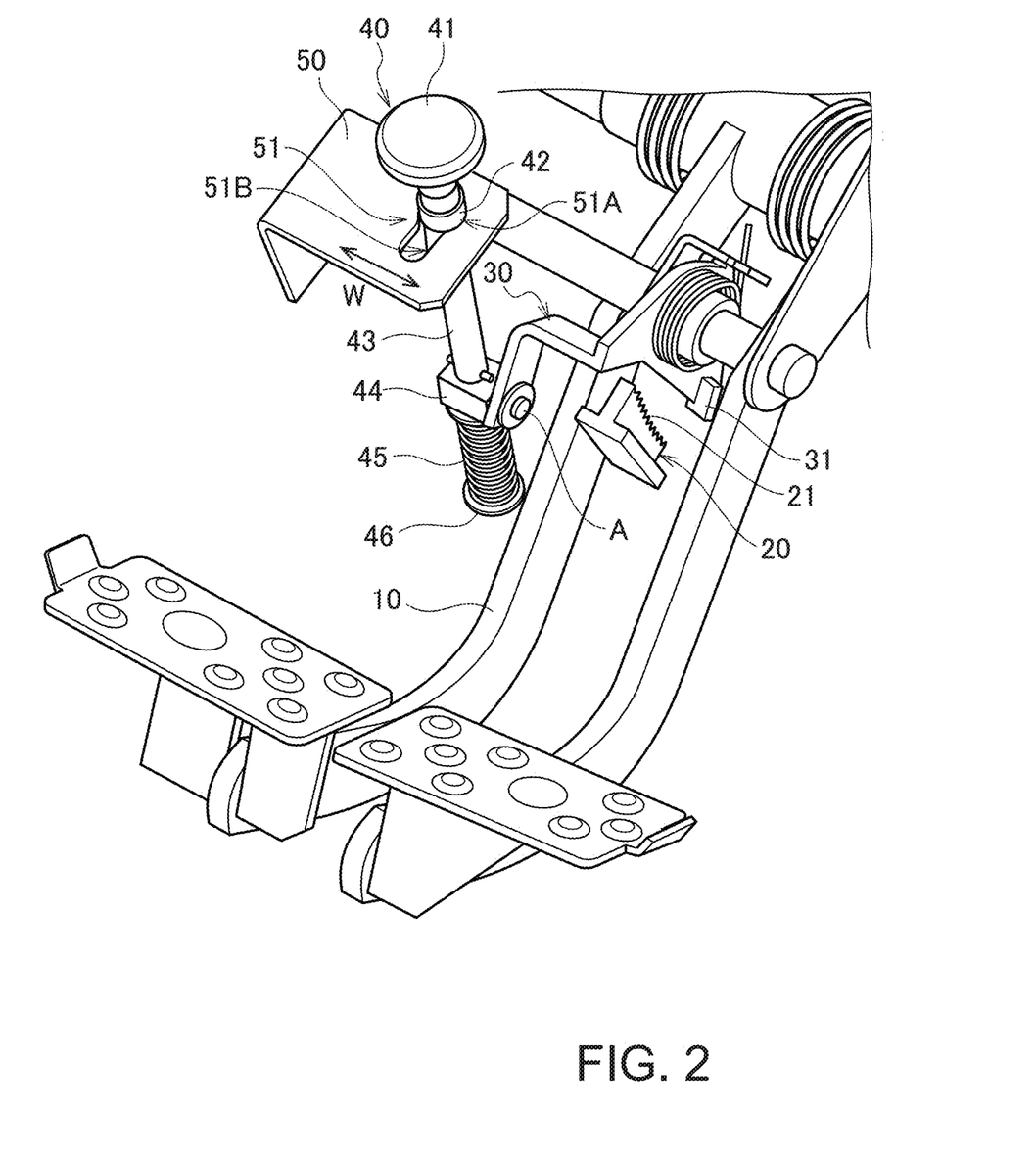
FIG. 2 is a diagram to illustrate an example of a structure of a parking brake of the work vehicle 100 according to a preferred embodiment of the present invention.
Figure 3:
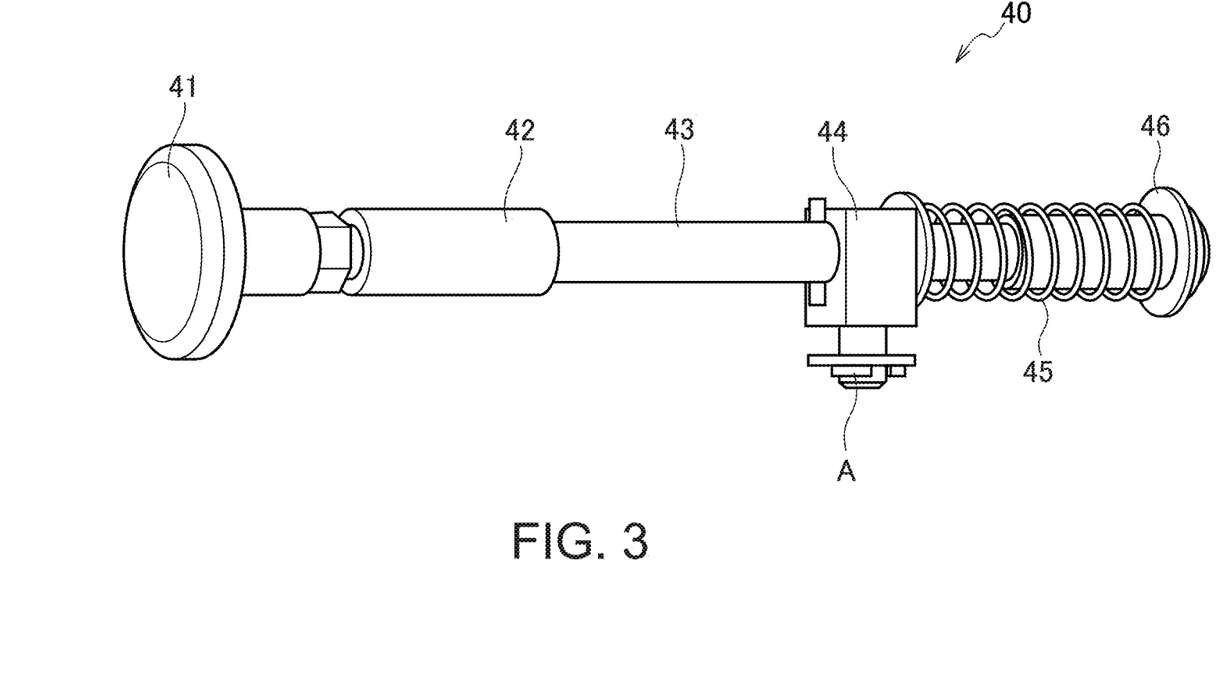
FIG. 3 is a diagram showing an example of a grip assembly 40 of the work vehicle 100 according to a preferred embodiment of the present invention.
Figure 4:
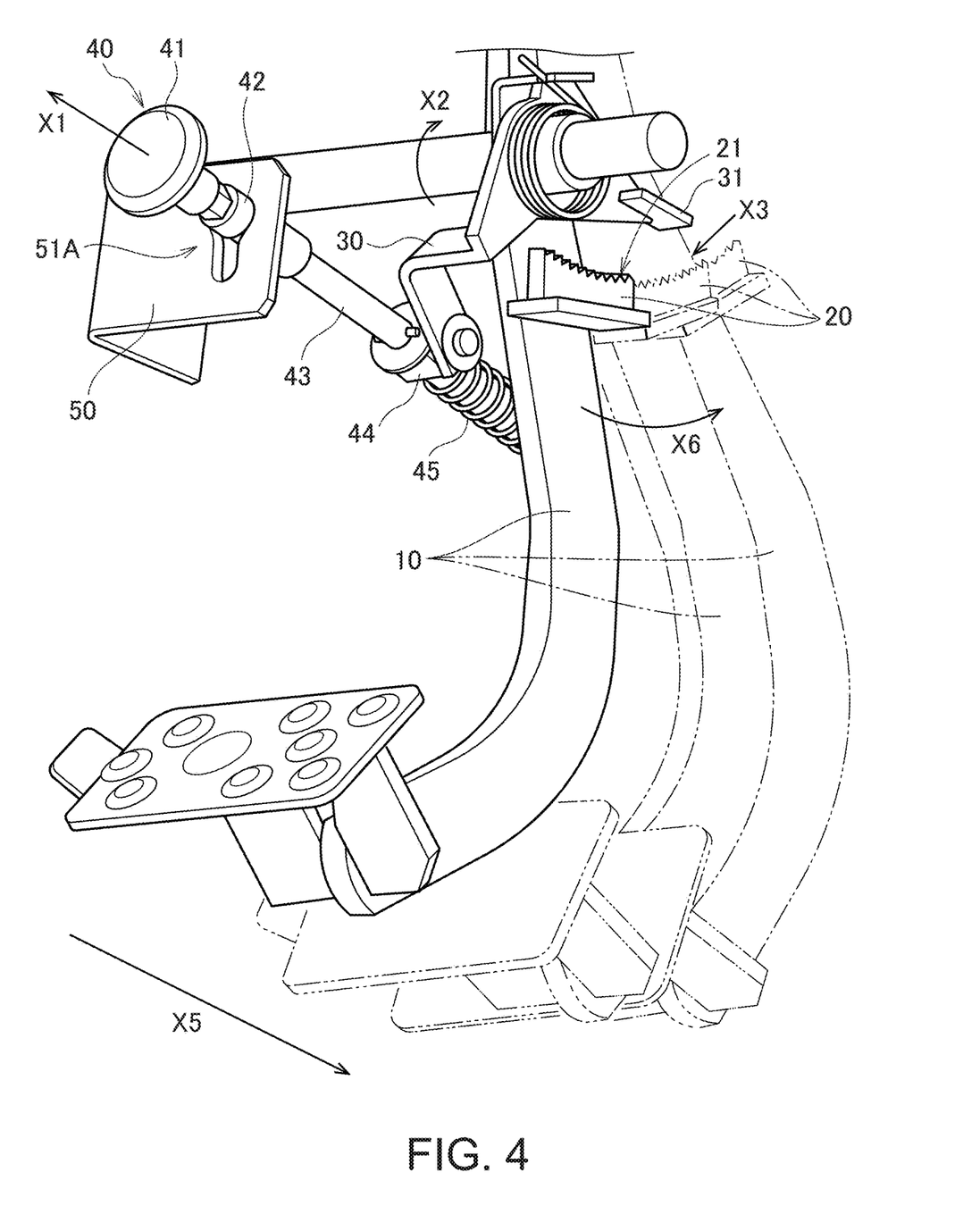
FIG. 4 is a diagram to illustrate an example of an operation to lock the parking brake in the work vehicle 100 according to a preferred embodiment of the present invention.
Figure 5:
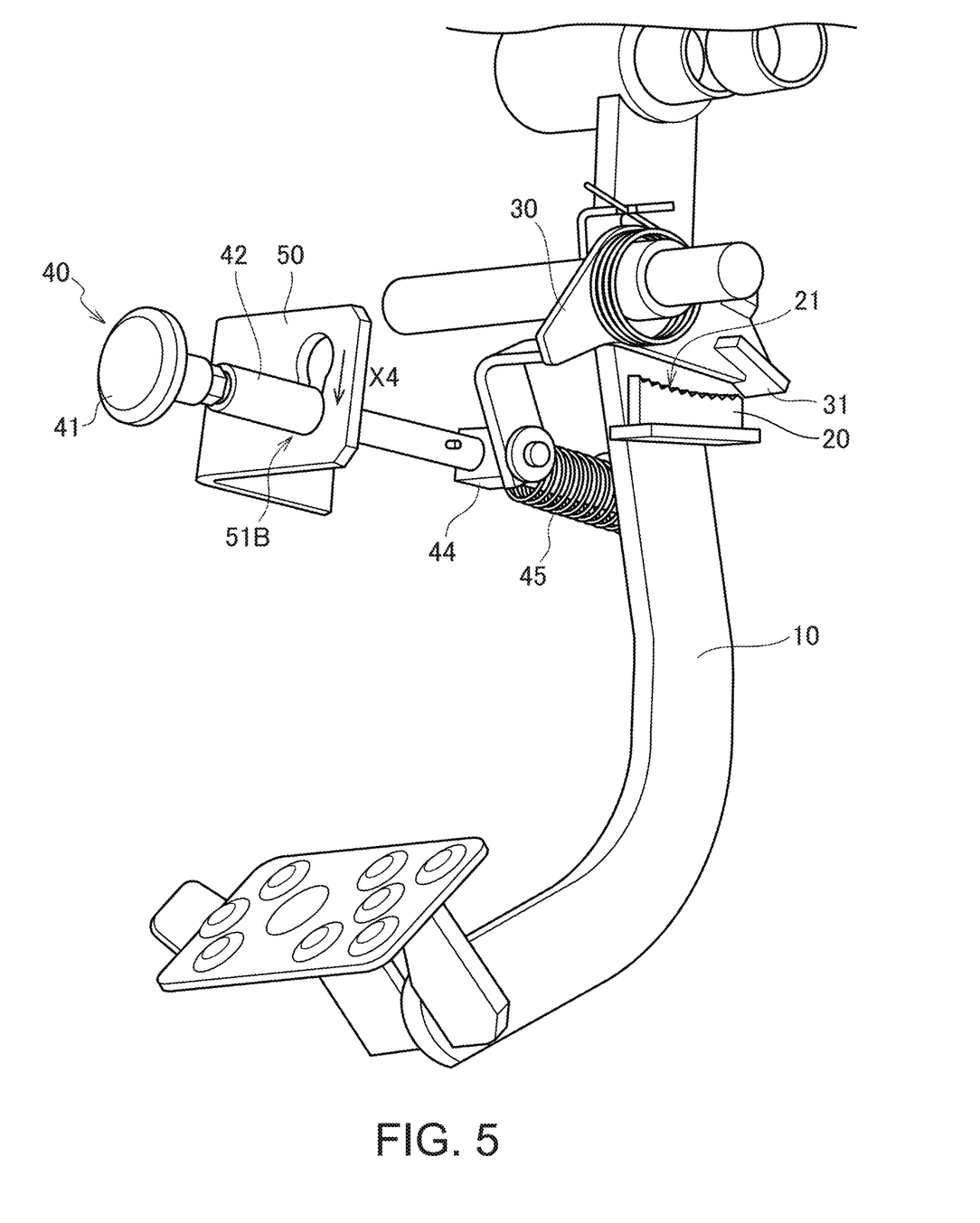
FIG. 5 is a diagram to illustrate an example of an operation to lock the parking brake in the work vehicle 100 according to a preferred embodiment of the present invention.
Figure 6:
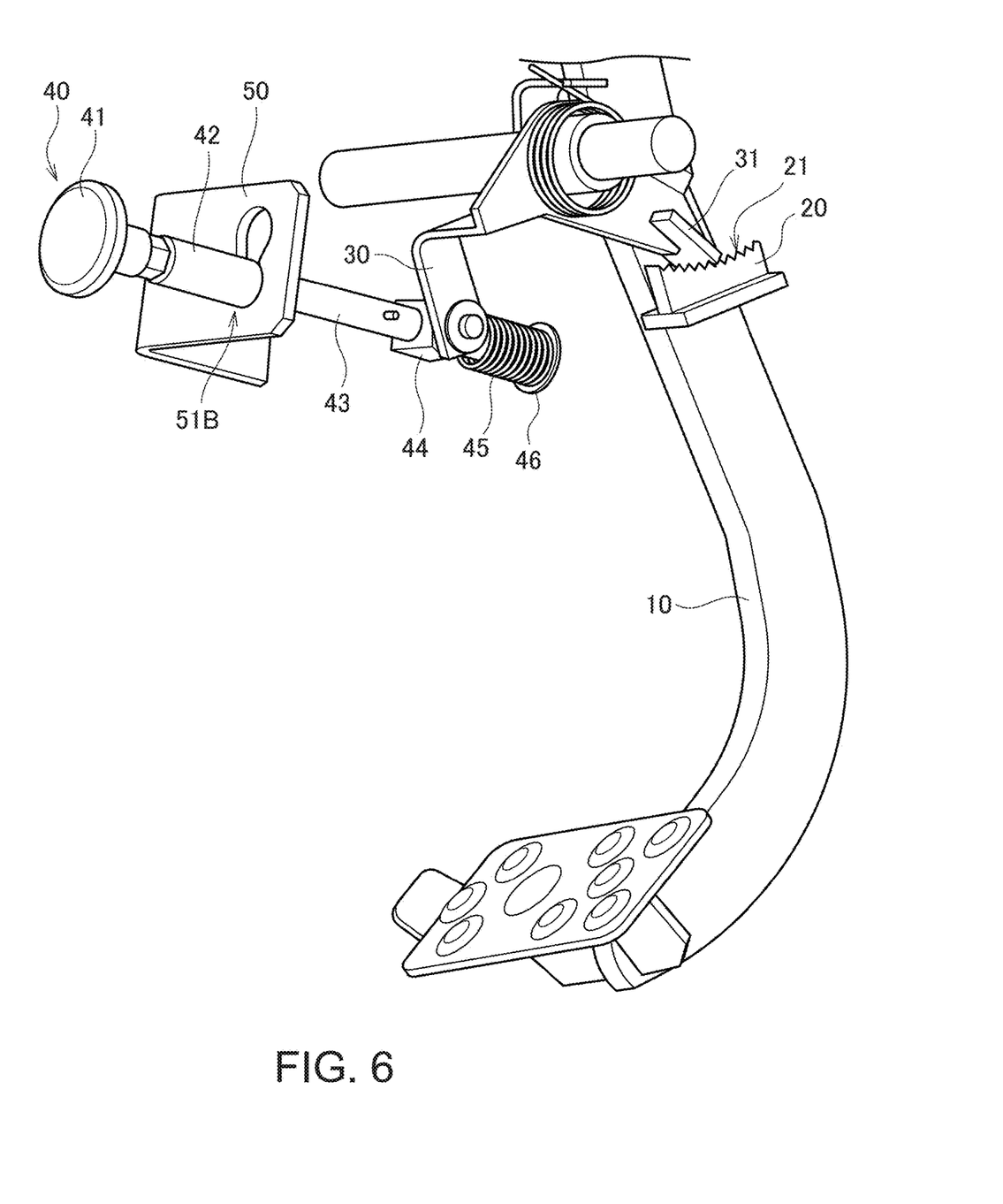
FIG. 6 is a diagram to illustrate an example of an operation to lock the parking brake in the work vehicle 100 according to a preferred embodiment of the present invention.

FIG. 1 is a diagram showing an example of portion of a lateral surface of the work vehicle 100 according to the present preferred embodiment. FIG. 2 is a diagram to illustrate an example of a structure of a parking brake of the work vehicle 100 according to the present preferred embodiment. FIG. 3 is a diagram showing an example of a grip assembly 40 of the work vehicle 100 according to the present preferred embodiment. FIGS. 4 to 6 are diagrams to illustrate an example of an operation to lock the parking brake in the work vehicle 100 according to the present preferred embodiment.

The work vehicle 100 according to the present preferred embodiment is a tractor, for example. However, the work vehicle 100 is not limited to a tractor, and may be an agricultural machine (agricultural vehicle) such as a combine harvester or a transplant machine, or may be a construction machine (construction vehicle) such as a loader work machine.

A shown in FIGS. 1 and 2, the work vehicle 100 according to the present preferred embodiment includes a brake pedal 10, a notch structure 20, a stay 50, the grip assembly 40, and a brake lever 30.

As will be described below, the configuration is such that the work vehicle (driver) is able to operate the parking brake by using the brake pedal 10 and the grip assembly 40 in the work vehicle 100.

As shown in FIG. 2, the brake lever 30 is connected to a pin 44 of the grip assembly 40, and has a claw 31 at one end. Note that, as shown in FIG. 2, the brake lever 30 is rotatable about an axis A.

The notch structure 20 is attached to the brake pedal 10, and the notch 21 is formed as shown in FIG. 2.

As shown in FIG. 2, the grip assembly 40 is inserted into a through-hole 51. As shown in FIG. 3, the grip assembly 40 includes a rod 43, a grip 41, a collar 42, a plain washer 46, a pin 44, and a compression spring 45.

As shown in FIG. 3, the rod 43 has a circular cross-section and is configured in a linear shape. That is, as shown in FIG. 3, the rod 43 does not have a bent portion.

As shown in FIGS. 1 to 3, the grip 41 is provided at one end of the rod 43, and is a portion which is to be gripped when the operator pulls the grip assembly 40. For example, the grip 41 is formed from resin.

The cross-section of the grip 41 is circular so that rotation of the grip assembly 40 does not cause a problem. Furthermore, the diameter of the grip 41 is large enough to require a finger allowance when the operator pulls the grip with two fingers holding a center shaft from both sides, and the upper portion of the grip 41 can be pulled by the operator using only one finger and hence operability is high. With such a configuration, the grip 41 has a simple shape, and manufacturing costs are reduced.

As shown in FIGS. 2 and 3, the collar 42 is provided, near one end of the rod 43, so as to cover the outer periphery of the rod 43.

As shown in FIGS. 2 and 3, the plain washer 46 is provided at the other end of the rod 43.

As shown in FIGS. 2 and 3, the pin 44 covers the outer periphery of the rod 43, is provided so as to slide with respect to the rod 43, and is fastened near the other end of the brake pedal 10.

Sufficient clearance is secured between the rod 43 and the pin 44, and a smooth operation can be performed without twisting, even when contamination of foreign matter such as sand occurs. In addition, because the rod 43 and the hole in the pin 44 into which the rod 43 is inserted both have a circular cross-section, the rod 43 rotates with respect to the pin 44.

As shown in FIGS. 2 and 3, the compression spring 45 interconnects the plain washer 46 and the pin 44 and is provided so to cover the outer periphery of the rod 43.

As shown in FIG. 2, the stay 50 is attached to the main body of the work vehicle 100, and the through-hole 51 is formed in the stay 50.

As shown in FIG. 2, the through-hole 51 includes a first region 51A and a second region 51B. That is, the through-hole 51 is a keyhole-shaped hole.

Here, as shown in FIG. 2, the first region 51A is a region where the collar 42 is slidable. Meanwhile, the second region 51B has a length in the width direction W which is shorter than the outer diameter of the collar 42 and longer than the outer diameter of the rod 43.

As shown in FIG. 1, the work vehicle 100 may include a driver seat 1 and operation levers such as a position lever 61, a sensitivity adjustment lever 62, and a lifting lever (not illustrated) which are arranged on the right side of the driver seat.

The position lever 61 is a lever usable to set a control target height of a work device. The sensitivity adjustment lever 62 is a lever usable to adjust the lifting sensitivity of the work device. The lifting lever is a lever usable to selectively switch between a working state in which the work device is positioned at the control target height set by the position lever 61 and a non-working state in which the work device is positioned above the control target height.

As shown in FIG. 1, one end side (the grip 41 side) of the grip assembly 40 may be disposed in a position higher than the other end side of the grip assembly 40 (the side on which the plain washer 46 is provided). In the example of FIG. 1, the height position of the one end side of the grip assembly 40 is H1, and the height position of the other end side of the grip assembly 40 is H2.

Further, as shown in FIG. 1, in the work vehicle 100 according to the present preferred embodiment, the position H1 on the one end side and the position H2 on the other end side of the grip assembly 40 may be disposed between a highest position H3 and a lowest position H4 in the vertical direction of the operation positions of the position lever 61 and the sensitivity adjustment lever 62 (operation levers).

Note that, as shown in FIG. 1, in the work vehicle 100 according to the present preferred embodiment, the height position H1 of the grip 41 may be disposed at substantially the same height position as a bearing surface 1A of the driver seat 1. For example, the grip 41 may be disposed in a position approximately below the front-right knee of the operator when he is sitting on the bearing surface 1A of the driver seat 1.

Hereinafter, an example of the operation to lock the parking brake in the work vehicle 100 according to a preferred embodiment will be described with reference to FIGS. 4 to 6.

First, as shown in FIG. 4, in a case where the work vehicle 100 is in an unlocked state in which the collar 42 is located inside the first region 51A and the grip assembly 40 is not locked inside the through-hole 51, the operator pulls the grip 41 in direction X1.

As a result, as shown in FIG. 4, the compression spring 45 is compressed by the pin 44 and the plain washer 46, the brake lever 30 rotates in a direction X2, and the claw 31 moves in a direction X3 toward the notch 21.

Second, as shown in FIG. 5, the operator moves the grip assembly 40 in a direction X4 while holding the grip 41, thereby placing the rod 43 in the second region 51B.

As a result, as shown in FIG. 5, the work vehicle 100 transitions to a locked state in which the rod 43 is located inside the second region 51B and the grip assembly 40 is locked inside the through-hole 51.

Third, as shown in FIG. 1, in this locked state, the operator steps on the brake pedal 10 in a direction X5.

As a result, as shown in FIG. 1, the notch structure 20 moves in a direction X6, and as shown in FIG. 6, the claw 31 and the notch 21 engage with each other, and the brake pedal 10 is locked.

Hereinafter, an example of an operation to unlock the parking brake in the work vehicle 100 according to a preferred embodiment will be described with reference to FIGS. 4 and 6.

First, as shown in FIGS. 4 and 6, when the operator pulls the grip 41 in the direction X1 in the aforementioned locked state, thereby placing the rod 43 in the first region 51A, the work vehicle 100 transitions from the locked state to the unlocked state.

Second, as shown in FIG. 4, when the operator steps on the brake pedal 10 in the unlocked state, the notch structure 20 moves further in the direction X6, the claw 31 and the notch 21 are disengaged, and the brake pedal 10 is unlocked.

In the present preferred embodiment, when the grip 41 is pulled in an unlocked state in which the collar 42 is located inside the first region 51A and the grip assembly 40 is not locked inside the through-hole 51, a state is transitioned into a locked state in which the compression spring 45 is compressed by the pin 44 and the plain washer 46, the brake lever 30 rotates, the claw 31 moves toward the notch 21, and the rod 43 is located inside the second region 51B and the grip assembly 40 is locked inside the through-hole 51. When the brake pedal 10 is stepped on in this locked state, the claw 31 and the notch 21 engage with each other, and the brake pedal 10 is locked.

With such a configuration, because the parking brake can be applied by first fixing the grip assembly 40 in a state of being pulled and then stepping on the brake pedal 10, simultaneous operation of the brake pedal 10 and the brake lever 30 becomes unnecessary, and operability is improved.

In the present preferred embodiment, the configuration may be such that, when the brake pedal 10 is stepped on after the transition from the locked state to the unlocked state, the brake pedal 10 is unlocked.

With such a configuration, in order to unlock the brake pedal 10, it is necessary to perform a two-step operation to unlock the grip assembly 40, which is fixed to the stay 50, and then step on the brake pedal 10. It is therefore possible to reduce the risk of unlocking the brake pedal 10 by mistake.

In the present preferred embodiment, one end side (the grip 41 side) of the grip assembly 40 may be disposed in a position higher than the other end side (the side on which the plain washer 46 is provided) of the grip assembly 40.

Furthermore, according to the present preferred embodiment, the position H1 on the one end side and the position H2 on the other end side of the grip assembly 40 may be disposed between the highest position H3 and the lowest position H4 in the vertical direction of the operation positions of the operation levers.

With such a configuration, when operated by the hand of the operator, the grip 41 can be operated using a comfortable posture without bending the body.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A work vehicle comprising:
   a brake pedal;
   a notch structure attached to the brake pedal and including a notch;
   a stay including a through-hole;
   a grip assembly inserted into the through-hole; and
   a brake lever including a claw at one end; wherein the grip assembly includes:
      a rod with a circular cross-section and a linear shape;
      a grip at a first end of the rod;
      a collar at or adjacent to the first end of the rod so as to cover an outer periphery of the rod;
      a plain washer at a second end of the rod;
      a pin that covers an outer periphery of the rod, is slidable with respect to the rod, and is fastened at or adjacent to the second end of the brake pedal; and
      a compression spring that interconnects the plain washer and the pin and that covers the outer periphery of the rod;
   the through-hole includes a first region in which the collar is slidable, and a second region with a length in a width direction that is shorter than an outer diameter of the collar and longer than an outer diameter of the rod;
   when the grip is pulled in an unlocked state in which the collar is located inside the first region and the grip assembly is not locked inside the through-hole, a state is transitioned into a locked state in which the compression spring is compressed by the pin and the plain washer, the brake lever rotates, the claw moves toward the notch, and the rod is located inside the second region and the grip assembly is locked inside the through-hole; and
   when the brake pedal is stepped on in the locked state, the claw and the notch engage with each other, and the brake pedal is locked.

2. The work vehicle according to claim 1, wherein when the brake pedal is stepped on after the transition from the locked state to the unlocked state, the brake pedal is unlocked.

3. The work vehicle according to claim 1, wherein a first end side of the grip assembly is higher than a second end side of the grip assembly.

4. The work vehicle according to claim 3, wherein a position on the first end side and a position on the second end side of the grip assembly are between a highest position and a lowest position in a vertical direction of an operation position of an operation lever.

* * * * *